US012688642B2

(12) United States Patent
Pankratz et al.

(10) Patent No.: US 12,688,642 B2
(45) Date of Patent: Jul. 21, 2026

(54) INTERSECTABLE INSTANCE NODES FOR RAY TRACING ACCELERATION STRUCTURE NODES

(71) Applicants: Advanced Micro Devices, Inc., Santa Clara, CA (US); ATI Technologies ULC, Markham (CA)

(72) Inventors: David William John Pankratz, Markham (CA); David Kirk McAllister, Santa Clara, CA (US); David Ronald Oldcorn, Milton Keynes (GB); Michael John Livesley, Milton Keynes (GB); Daniel James Skinner, Milton Keynes (GB)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 117 days.

(21) Appl. No.: 18/081,407

(22) Filed: Dec. 14, 2022

(65) Prior Publication Data

US 2024/0203033 A1     Jun. 20, 2024

(51) Int. Cl.
*G06T 15/06*          (2011.01)
*G06T 15/08*          (2011.01)
*G06T 15/80*          (2011.01)

(52) U.S. Cl.
CPC .............. *G06T 15/06* (2013.01); *G06T 15/08* (2013.01); *G06T 15/80* (2013.01)

(58) Field of Classification Search
CPC .......... G06T 15/06; G06T 15/08; G06T 15/80
See application file for complete search history.

(56) References Cited

U.S. PATENT DOCUMENTS

| | | | | |
|---|---|---|---|---|
| 10,692,271 B1 * | 6/2020 | Saleh | ...................... | G06F 18/24 |
| 2017/0243375 A1 * | 8/2017 | Ceylan | .................. | G06T 15/005 |
| 2019/0355166 A1 * | 11/2019 | Clark | .................... | G06T 17/005 |
| 2020/0051318 A1 * | 2/2020 | Muthler | ................ | G06N 5/046 |
| 2021/0407177 A1 * | 12/2021 | Janus | ...................... | G06T 15/06 |
| 2022/0036639 A1 * | 2/2022 | Rabbani Rankouhi | ...................... G06T 15/005 |
| 2022/0068009 A1 * | 3/2022 | Wald | ..................... | G06T 15/005 |

OTHER PUBLICATIONS

Lefrancois, M.-K., "DX12 Raytracing tutorial—Part 1", downloaded from https://developer.nvidia.com/rtx/raytracing/dxr/dx12-raytracing-tutorial-part-1, on Dec. 9, 2022, 9 pgs.

* cited by examiner

*Primary Examiner* — Yi Yang
(74) *Attorney, Agent, or Firm* — Volpe Koenig

(57) ABSTRACT

A technique for performing ray tracing operations is provided. The technique includes, in a first iteration of a ray traversal technique, traversing to an instance node of a bounding volume hierarchy; in a second iteration of the ray traversal technique that is subsequent to the first iteration, transforming a ray based on an instance transform of the instance node to generate a transformed ray; and in the second iteration, performing a ray-box intersection test for box node data of the instance node based on the transformed ray.

20 Claims, 9 Drawing Sheets

100

402

404

500

850(1)

900

For a first iteration, determine that an instance node is to be traversed to

902

In a second iteration, perform a ray transformation as specified by the instance node

904

In the second iteration, perform box node intersection tests using the transformed ray and using bounding box geometry specified in the instance node

906

INTERSECTABLE INSTANCE NODES FOR RAY TRACING ACCELERATION STRUCTURE NODES

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique for performing ray tracing operations is provided. The technique includes, in a first iteration of a ray traversal technique, traversing to an instance node of a bounding volume hierarchy; in a second iteration of the ray traversal technique that is subsequent to the first iteration, transforming a ray based on an instance transform of the instance node to generate a transformed ray; and in the second iteration, performing a ray-box intersection test for box node data of the instance node based on the transformed ray.

Figure 1:
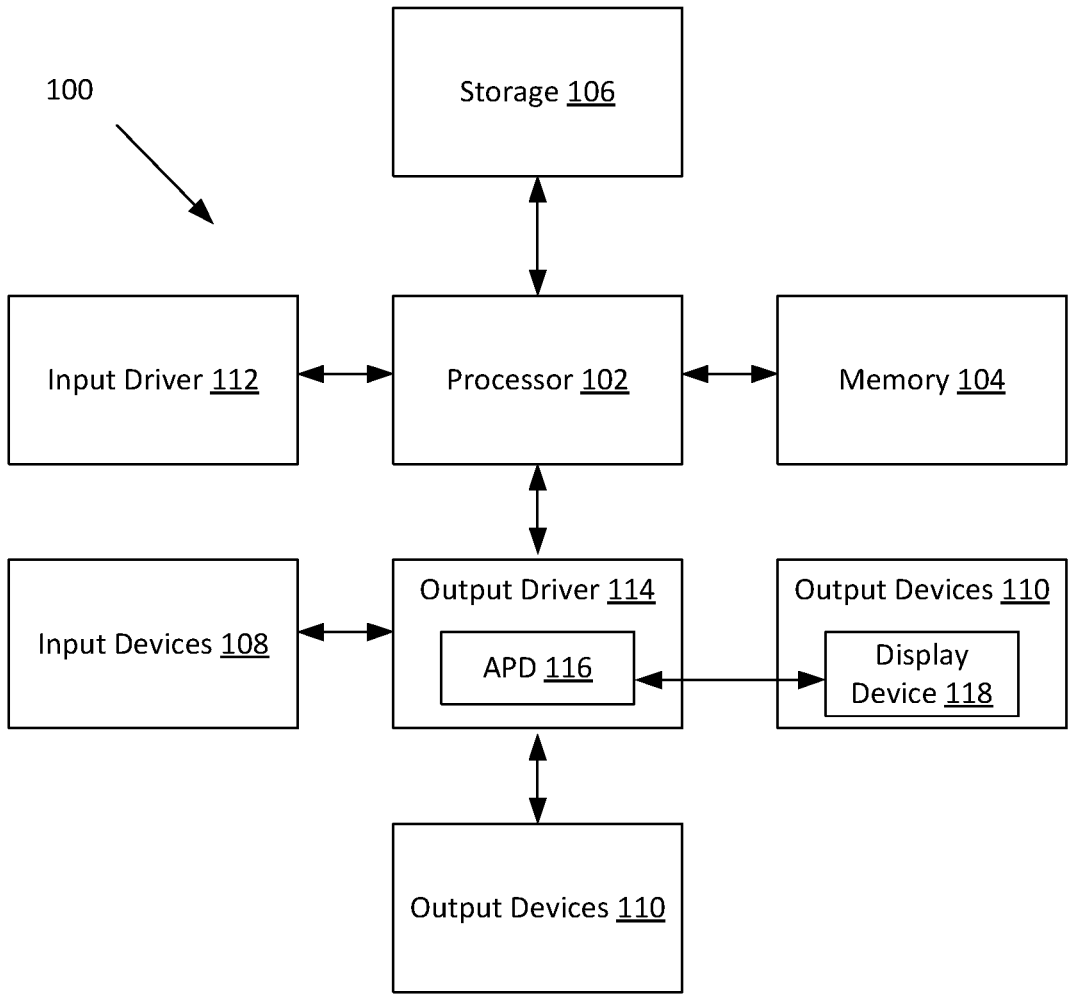
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
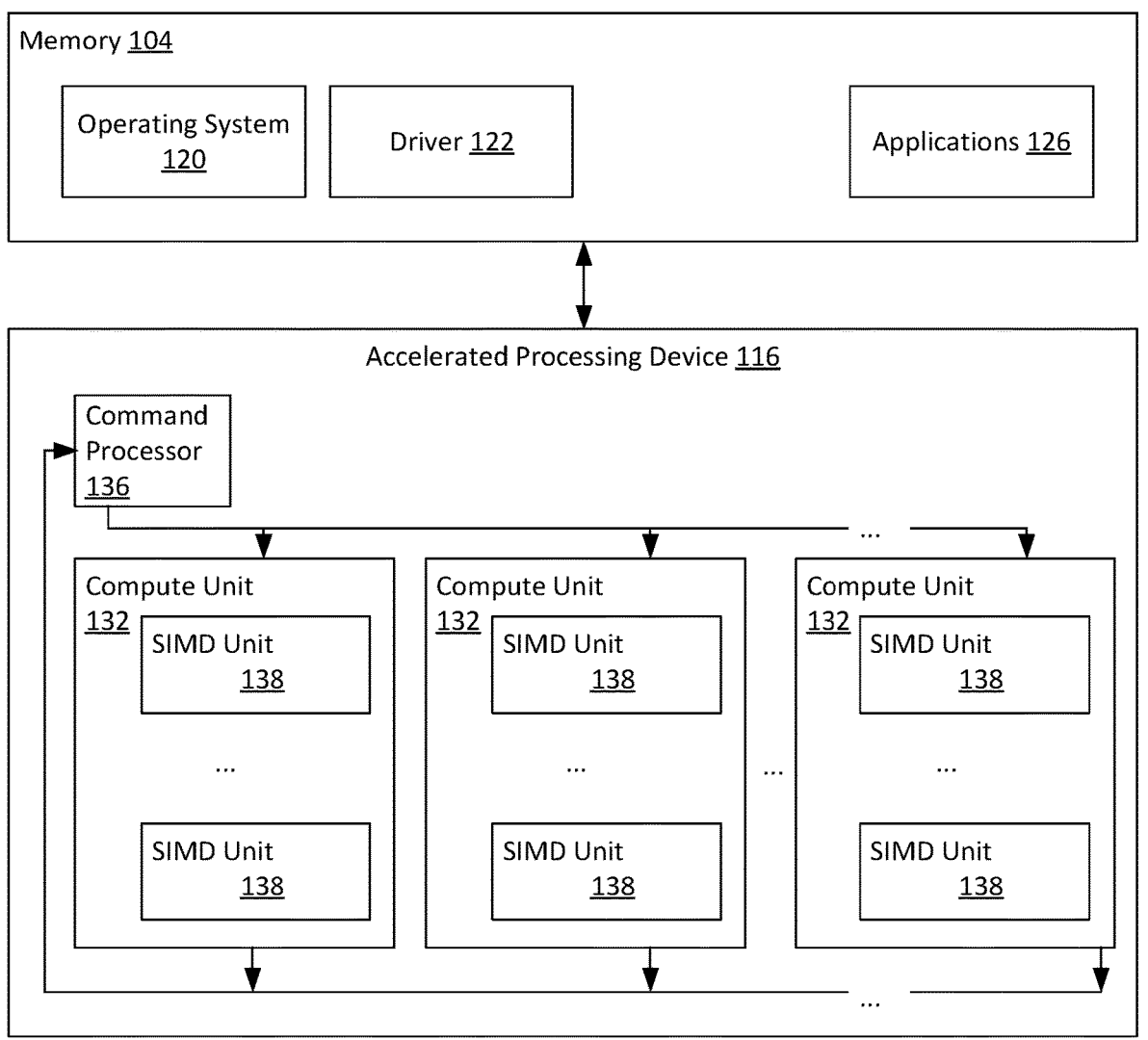
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126.

These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 (together, parallel processing units 202) that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
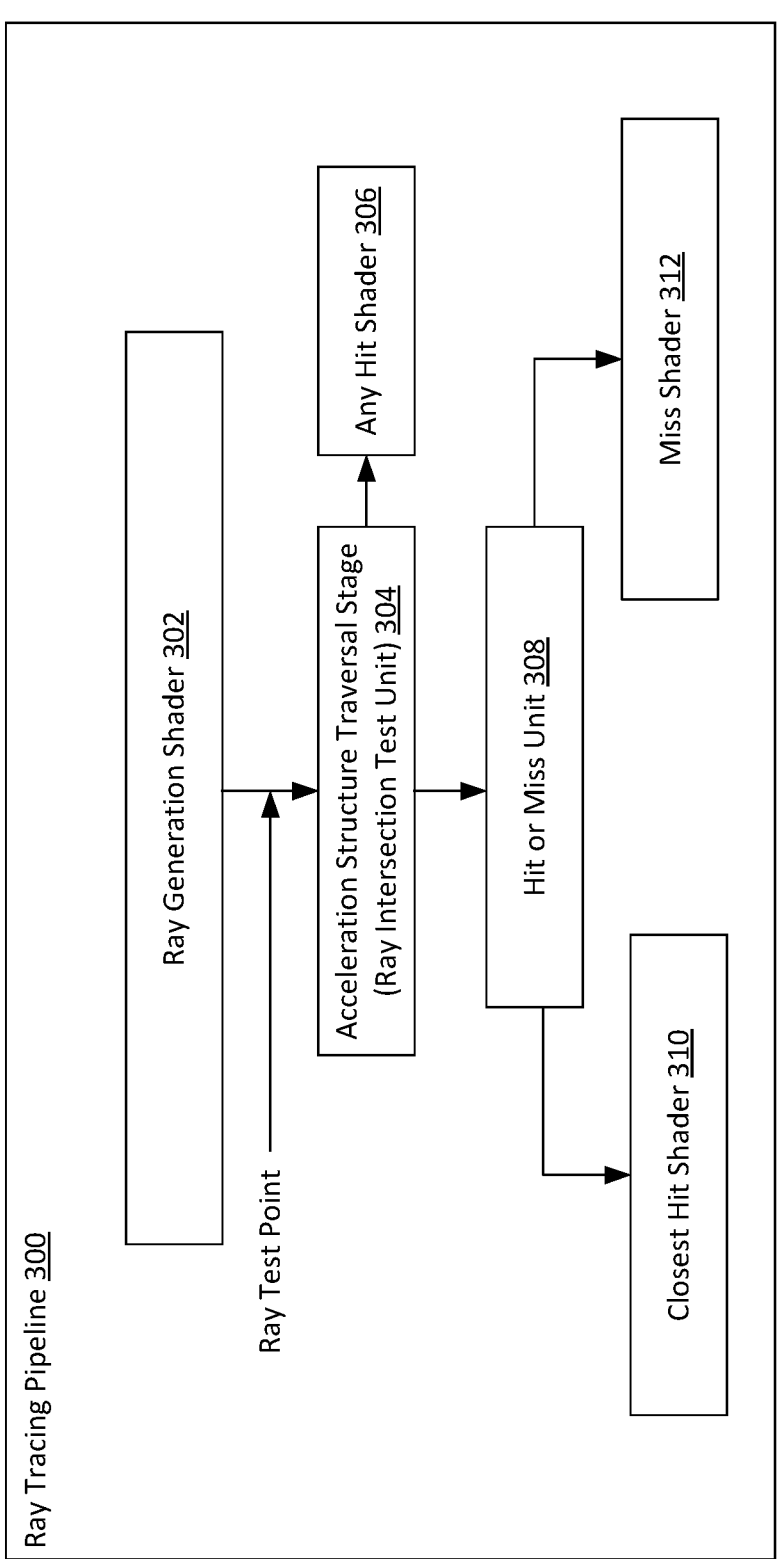
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is precompiled by an application compiler and/or compiled by the driver 122). The acceleration structure traversal stage 304 performs a ray intersection test to determine whether a ray hits a triangle.

The various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 may be orchestrated partially or fully in software or partially or fully in hardware, and may be orchestrated by the processor 102, the scheduler 136, by a combination thereof, or partially or fully by any other hardware and/or software unit. The term "ray tracing pipeline processor" used herein refers to a processor executing software to perform the operations of the ray tracing pipeline 300, hardware circuitry hard-wired to perform the operations of the ray tracing pipeline 300, or a combination of hardware and software that together perform the operations of the ray tracing pipeline 300.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For non-opaque triangles that are hit, the ray tracing pipeline 300 may trigger execution of an any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader.

Note, it is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for the closest hit shader 310 or miss shader 312 to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parent, and so on. Leaf nodes represent a triangle against which a ray test can be performed. It should be understood that where a first node points to a second node, the first node is considered to be the parent of the second node.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
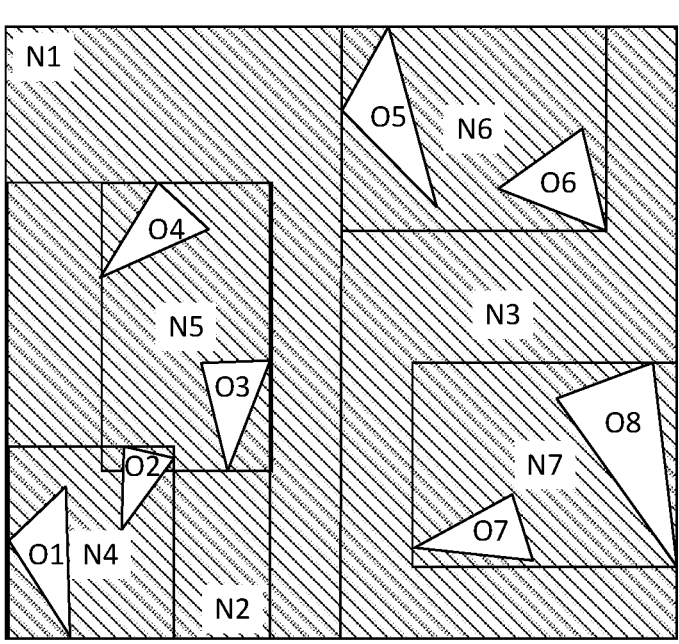
FIG. 4 is an illustration of a bounding volume hierarchy, according to an example.
Figure 4:
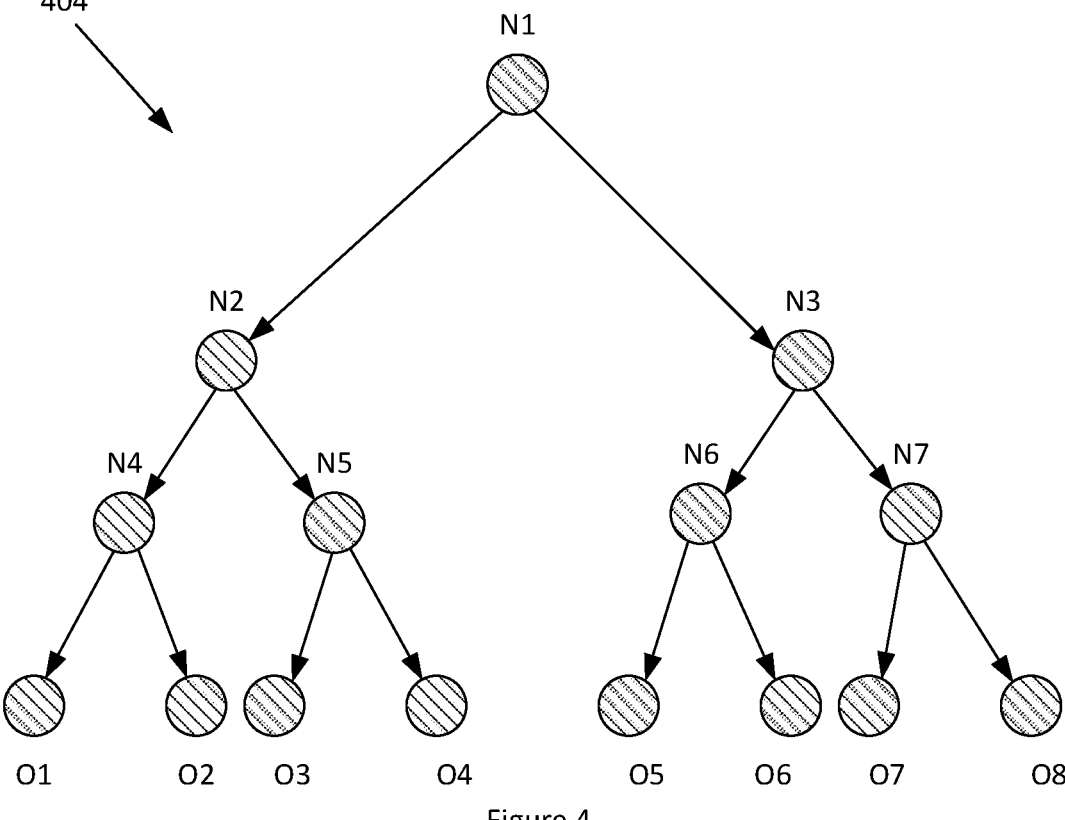

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node.

In an example, the ray intersects $O_5$ but no other triangle. The test would test against $N_1$, determining that that test succeeds. In this example, the test would test against $N_2$, determining that the test fails. The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed. Note that rays can have a variety of directions and can have an origin in a variety of locations. Thus, the specific boxes eliminated or not eliminated would depend on the origin and direction of the rays. However, in general, testing the rays for intersection with boxes eliminates some leaf nodes from consideration.

Figure 5:
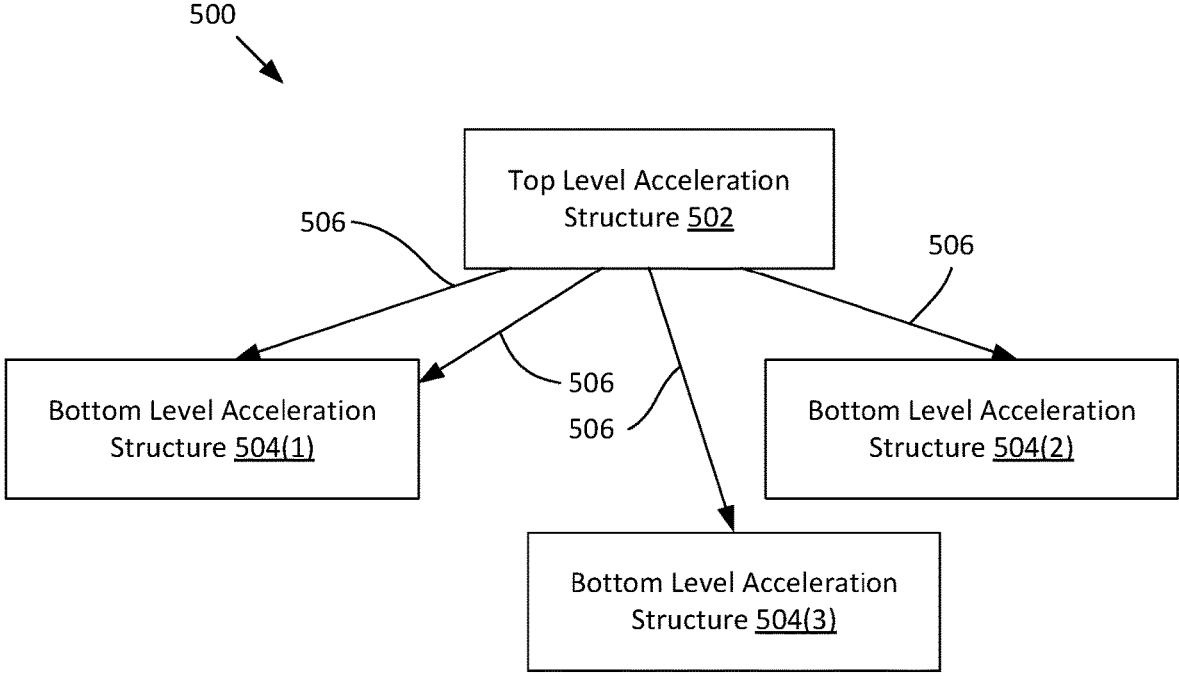
FIG. 5 illustrates an example two level acceleration structure.

FIG. 5 illustrates an example two level acceleration structure 500. In some examples, a bounding volume hierarchy is implemented as a two level acceleration structure 500. The two level acceleration structure 500 includes a top level acceleration structure 502 and a plurality of bottom level acceleration structures 504. The top level acceleration structure 502 includes box nodes (not shown in FIG. 5), can include leaf nodes, and includes instance nodes that include one or more pointers 506 to bottom level acceleration structures 504. Different instance nodes can point to the same bottom level acceleration structures 504, but with different transforms. In the example of FIG. 5, two pointers 506 point to one bottom level acceleration structure 504(1). A transform reflects modifications to the geometry of the bottom level acceleration structure 504, such as positional modifications, which allows the instance to be used multiple times without copying the data. In an example, a bottom level acceleration structure 504 represents an object such as a tree and multiple instance nodes with different transforms are present in the bounding volume hierarchy, which causes the object to exist multiple times at different locations and orientations.

Figure 6:
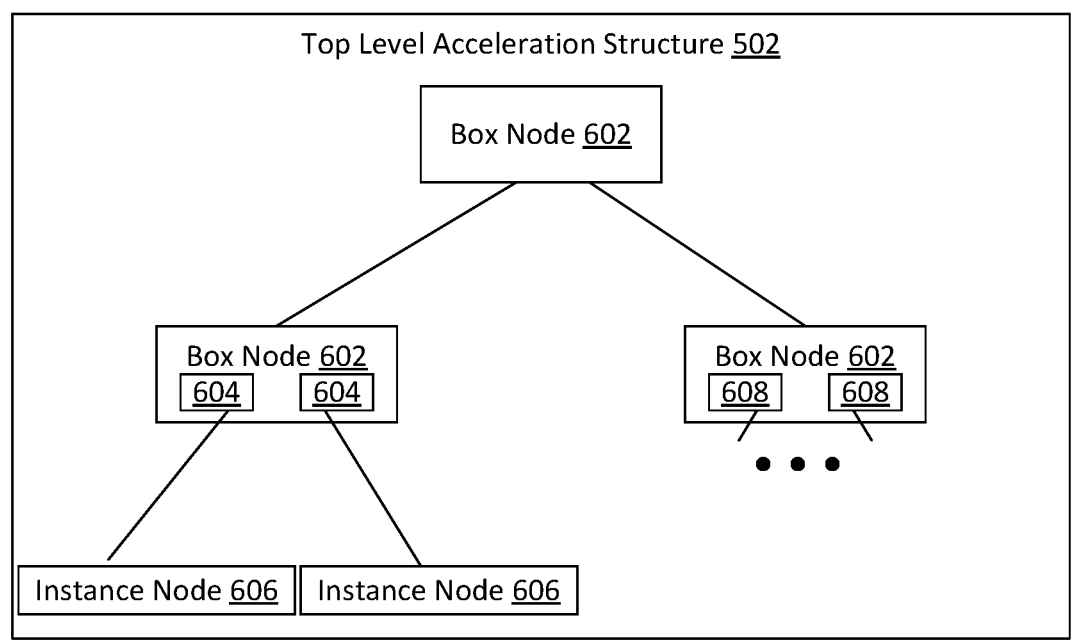
FIG. 6 illustrates details of a top level acceleration structure, according to an example.

FIG. 6 illustrates details of a top level acceleration structure 502, according to an example. The top level acceleration structure 502 includes box nodes 602 and instance nodes 606. The box nodes 602 include box node child information 608. Each item of box node child information 608 includes a bounding box and a pointer to a child node. The bounding box bounds all geometry of the associated child node. In other words, the bounding box in an item of box node child information 608 bounds the node pointed to by the pointer of that box node child information 608. Some box nodes 602 include pointers 604 to instance nodes 606. In some implementations, some box nodes include pointers to leaf nodes (not shown in FIG. 6).

Figure 7A:
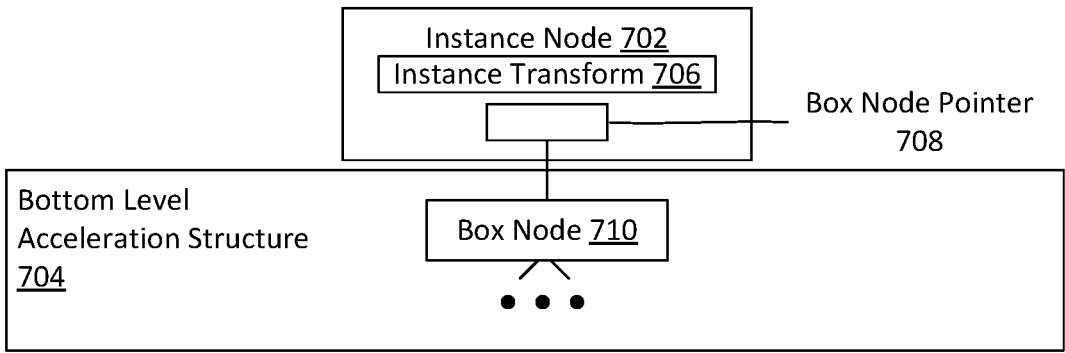
FIG. 7A illustrates an example of a bottom level acceleration structure.

FIG. 7A illustrates one example of a bottom level acceleration structure 700. An instance node 702, which is an example of the instance node 606 of FIG. 6, is illustrated as pointing to the bottom level acceleration structure 704. The instance node 702 (which is in the top level acceleration structure) includes an instance transform 706 and a box node pointer 708. The box node pointer 708 points to a box node 710, which is a part of the bottom level acceleration structure 704 (e.g., a root node of the bottom level acceleration structure 704). The box node 710 includes information for child nodes of that box node 710, such as bounding box information, which allows the ray tracing pipeline 300 to determine whether a ray intersects with those children, in a similar manner as with box node data 608. The pointed to box node 710 can be considered the root node of the bottom level acceleration structure 704.

The instance transform 706 defines a transform that is considered to be applied to all geometry of the bottom level acceleration structure 704. In an example, the instance transform 706 describes translation (i.e., position adjustment), scaling (i.e., size adjustment), and/or shearing (i.e., displacement of vertex positions along one or more vertices) that is applied to all geometry of the bottom level acceleration structure 704. It should be understood that although only the box node 710 is shown, the bottom level acceleration structure 704 also includes children of the box node 710, children of those nodes, and so on, and can include leaf nodes associated with geometry such as triangles.

In some examples, the ray tracing pipeline 300 applies the actual transformations defined by the instance transform 706 to the ray that is being tested for intersection against the geometry of the bottom level acceleration structure 704. In other words, the ray tracing pipeline 300 transforms the ray, rather than all of the geometry. The test for intersection of such a ray with the geometry would still yield the correct results as if an untransformed ray were tested against geometry of the bottom level acceleration structure 704 that was transformed. Transforming the ray instead of that geometry is thus more efficient in that only one transformation operation needs to be performed per bottom level acceleration structure 704.

The ray tracing pipeline 300 (e.g., the acceleration structure traversal stage 304) performs traversal of the bounding volume hierarchy, which includes a top level acceleration structure 502 and one or more bottom-level acceleration structures, in iterations. Within each iteration, the ray tracing pipeline 300 retrieves one or more nodes (box nodes, leaf nodes, or instance nodes) from a working set of nodes. For box nodes, the ray tracing pipeline 300 tests the ray for intersection with the children of those nodes and places the intersected nodes into the working set. For instance nodes 702, the ray tracing pipeline 300 applies the transformation specified by the instance transform 706 to the ray and places the child of that instance node 702 into the working set. This iterative process continues until a traversal end condition is met, such as when all triangle nodes that intersect the ray have been found, when one triangle node that intersects the ray has been found, when it is determined that the ray intersects no triangles, or in any other condition. As can be seen, with the example implementation of the instance node 702 of FIG. 7A, in one iteration of BVH traversal, an instance node 702 is processed, and a child of that instance node 702 is processed in the subsequent iteration, but no intersection tests are performed for children of that instance node 702. Instead, the transformation is applied to the ray and the child of that instance node 702 is placed into the working set without testing whether the ray intersects that child.

Figure 7B:
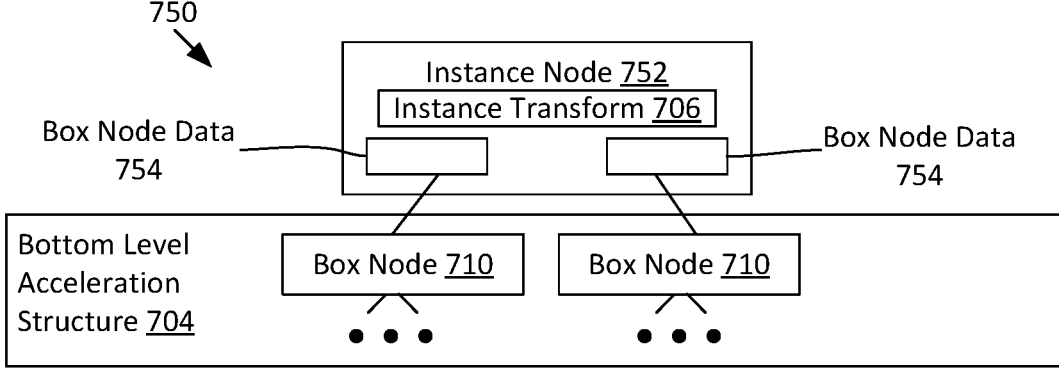
FIG. 7B illustrates an example bottom level acceleration structure that includes an instance node that, in addition to including an instance transform, also includes box node data.

Advantage may be gained by incorporating at least some box information into the instance node itself, so that a ray can be tested for intersection of children of an instance node 702 in the same iteration as the iteration in which the transformation is applied to the ray. FIG. 7B illustrates an example bottom level acceleration structure 750 associated with an instance node 752 that, in addition to including an instance transform 706, also includes box node data 754. The instance node 752 is an example of the instance node 606 of FIG. 6. The instance transform 706 is similar to the instance transform 706 of FIG. 7A, and includes information indicating transformation for the geometry of the bottom level acceleration structure 750 (e.g., translation, scaling, and shear), for application to the ray. Each item of box node data 754 includes information that geometrically specifies a bounding box, and also includes a pointer to the box node 710 associated with that geometric bounding box.

Including the instance transform 706 and box node data 754 in the instance node 752 allows the ray transformation to be performed in the same iteration as the test for intersection of the ray with at least some box nodes of the bottom level acceleration structure 750. In an example, in one iteration, the ray tracing pipeline 300 encounters, within a box node, a pointer to an instance node, and places that instance node 752 into the working set of nodes. In a subsequent iteration, the ray tracing pipeline 300 obtains the instance node 752. The ray tracing pipeline 300 utilizes the instance transform 706 to transform the ray and in the same iteration, tests whether the transformed ray intersects the boxes associated with the box node data 754, which refers to children of the instance node 752. For each such child for which the transformed ray intersects the corresponding box node, the ray tracing pipeline 300 places that child into the working set.

In some examples, the instance node 752 is the same size as a box node 710. The instance transform 706 does not consume all such space and thus there is sufficient space for at least some box node data 754. In some system implementations that use the instance node 702 of FIG. 7A, there is only sufficient hardware to perform either a ray transform or box node intersections in a single iteration. In implementations that utilize the instance node 752 of FIG. 7B, there is sufficient hardware to perform a ray transform and all box intersections in a single iteration. In some examples, the hardware that performs the ray transform is similar to the hardware that performs the box intersections. For example, ray transforms are performed with matrix multipliers, which include multiply and add units, and box intersection tests are performs with similar hardware. In some examples, this hardware is available because the ray intersection test unit 304 includes a large number of box intersection test units, so that the ray intersection test unit 304 is capable of performing multiple box intersection tests in parallel. In some examples, the number of box nodes within an instance node 752 is limited to less than the total number of box intersection tests that can be performed in parallel, since the ray transform for the instance transform 706 would consume some of the hardware resources that could be utilized for performing box intersection tests, and/or because the space of the box node that would include more box data is consumed by the instance transform 706.

It should be understood that the instance node 702 of FIG. 7A includes a pointer to a box node (box node pointer 708) but does not include information that would allow the ray tracing pipeline 300 to determine whether the ray intersects the bounding box for that box node. It should also be understood that the box node data 754 includes both a pointer to a box node 710 as well as information indicating the bounding box that bounds (e.g., tightly bounds) all geometry of that box node. Including this information the box node data 754 allows the ray tracing pipeline 300 to test each for intersection with a ray each box node represented by the box node data 754 of an instance node 752, and to perform all such tests in the same iteration and in the iteration in which performing the transform of the ray according to the instance transform 706 occurs. In other words, including the instance transform 706 and the box node data 754 in a single node allows for the instance transform and some box node tests to occur in the same iteration and for intersected box nodes 710 to be fetched in the iteration subsequent to the iteration in which the instance transform 706 is performed and the box node data 754 is tested for intersection. By contrast, with the instance node 752 of FIG. 7A, in which box node data 754 is not included (even though a box node pointer 708) is included, in one iteration, the ray tracing pipeline 300 performs the instance transform based on the instance transform data 706 but does not perform any intersection tests between the box and the ray. Including the box node data 754 within the instance node 752 thus improves the performance of the ray tracing pipeline 300 by reducing the number of fetches from memory and increasing the number of operations that can be performed in parallel.

Figure 8A:
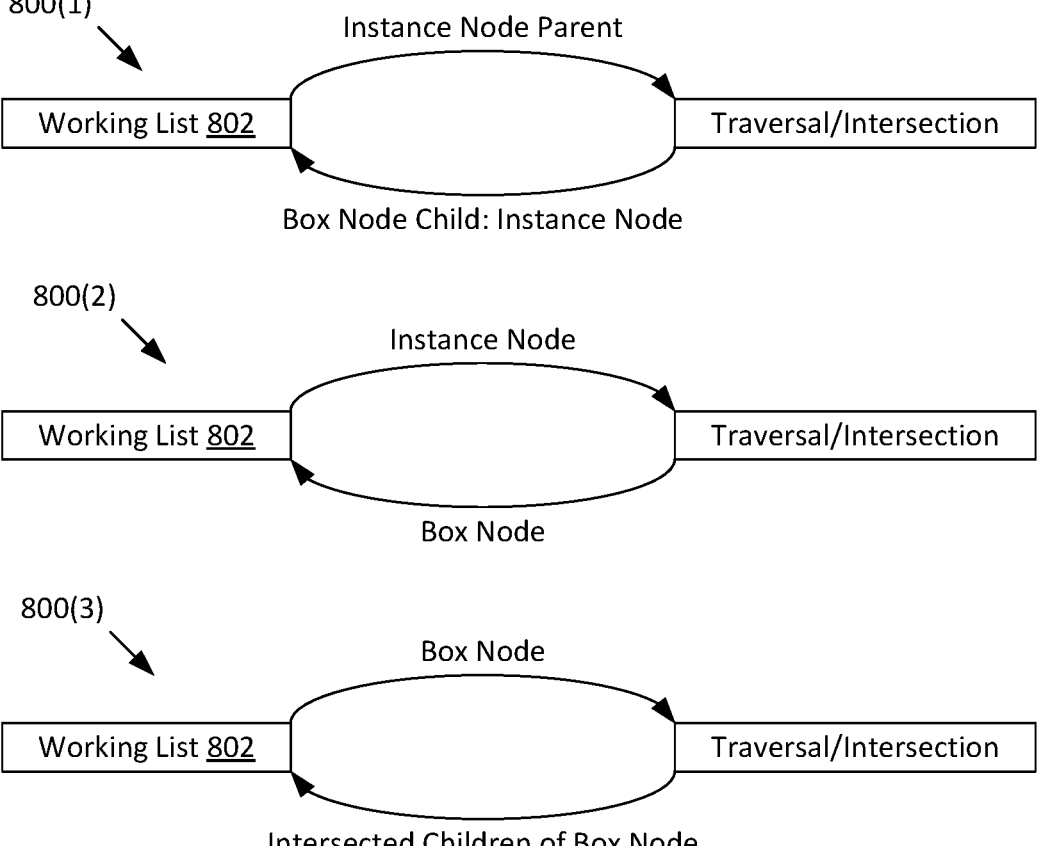
FIG. 8A illustrates operations for traversing an instance node of a bounding volume hierarchy, where the instance node does not include box node data, according to an example.

FIG. 8A illustrates operations for traversing an instance node 702 of a bounding volume hierarchy, where the instance node 702 does not include box node data 754, according to an example. Prior to the operations shown in FIG. 8A, the ray tracing pipeline 300 has traversed through at least a portion of a bounding volume hierarchy including an instance node 702. In the course of such traversal, the ray tracing pipeline 300 has placed a pointer to a parent of an instance node 702 into a working list 802 of bounding volume hierarchy nodes that are to be checked. More specifically, in each iteration, the ray tracing pipeline 300 selects one or more items from the working list 802 to process. The processing may or may not result in placing new items into the working list 802. Each item is a node of the BVH (e.g., a leaf node, a box node, or an instance node). For a box node, in the event that any child of that box node is determined to intersect with the ray, the ray tracing pipeline 300 places such child or children into the working list 802. For the instance node 702 without box node data 754, the ray tracing pipeline 300 places the box node 710 pointed to by the box node pointer 708 into the working list 802. At operation 800(1), the ray tracing pipeline retrieves a node from the working list 802 that is a parent of an instance node 702. In this situation, the ray tracing pipeline 300 places the instance node into the working list 802.

At step 800(2), which represents an iteration subsequent to the iteration 800(1), the ray tracing pipeline 300 fetches the instance node. The ray tracing pipeline performs the transform on the ray according to the instance transform 706. The ray tracing pipeline 300 also obtains the box node pointer 708 from the instance node and places the box node 710 for that box node pointer into the working list. At step 800(3), which is an iteration subsequent to the iteration 800(2), the ray tracing pipeline fetches the box node 710 and processes that box node normally, testing the bounding boxes for the children of that box node for intersection with the ray and placing the children that are intersected by the ray into the working list 802. After this time, the ray tracing pipeline 300 traverses the remainder of the BVH, processing the items of the working list 802, and so on. Nodes that are descendants of the instance node 702 are processed with a ray transformed according to the instance transform 706.

Figure 8B:
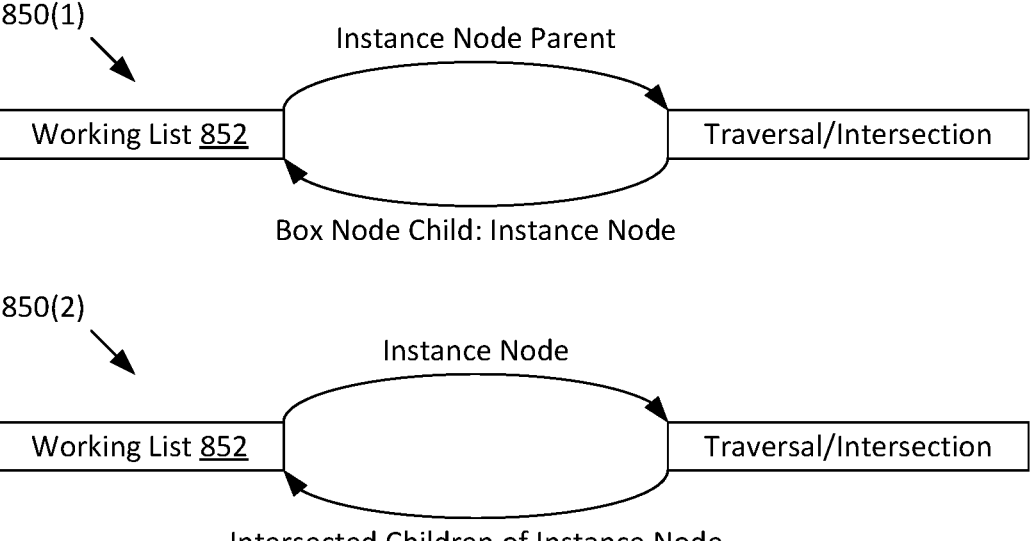
FIG. 8B illustrates operations for processing an instance node that includes an instance transform and one or more box node data items, according to an example.

FIG. 8B illustrates operations for processing an instance node 752 that includes an instance transform 706 and one or more box node data items 754, according to an example. Prior to operation 850(1), the ray tracing pipeline 300 has traversed at least a portion of the BVH and has placed an instance node parent into the working list 852. At operation 850(1), the ray tracing pipeline 300 fetches the instance node parent and places the instance node into the working list 852. At step 852(2), which is an iteration that is subsequent to the iteration of operation 850(1), the ray tracing pipeline 300 performs the transform for the ray as specified by the instance transform 706 and also tests the transformed ray for intersection with the boxes represented by the box node data 754. For each such box node that is determined to be intersected, the ray tracing pipeline 300 places such box nodes into the working list 852.

Figure 9:
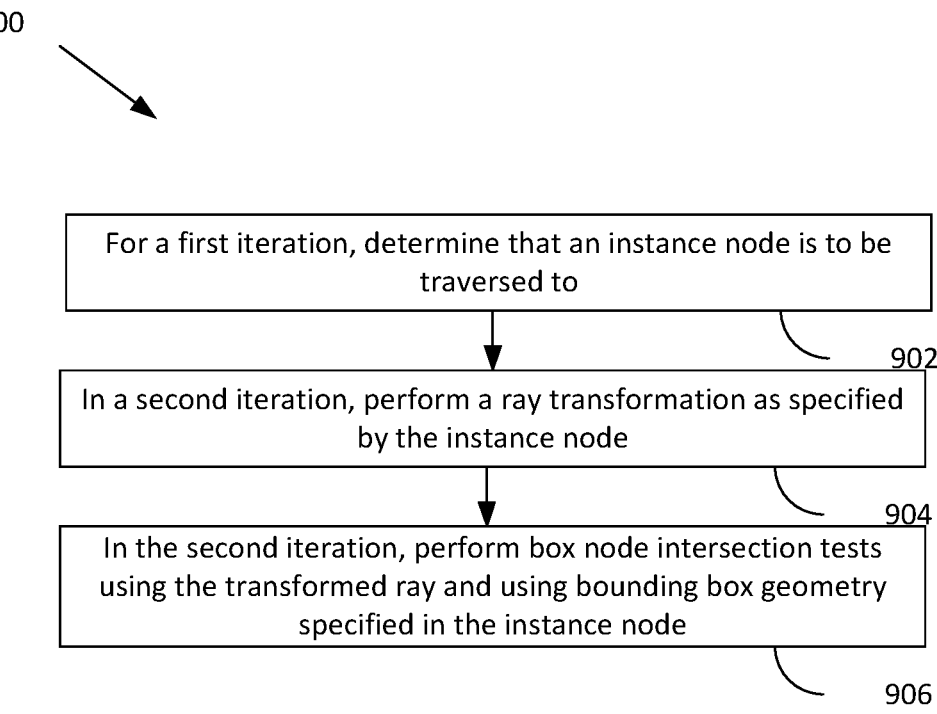
FIG. 9 is a flow diagram of a method for performing ray tracing operations, according to an example.

FIG. 9 is a flow diagram of a method 900 for performing ray tracing operations, according to an example. Although described with respect to the system of FIGS. 1-8B, those of skill in the art will understand that any system configured to perform the steps of the method 900 in any technically feasible order falls within the scope of the present disclosure.

At step 902, for a first iteration, the ray tracing pipeline 300 determines that an instance node is to be traversed to. The instance node includes an instance transform 706 and one or more items of box node data 754. In some examples, this operation is performed in the situation that the ray tracing pipeline 300 traverses to a parent of the instance node. In this situation, the ray tracing pipeline 300 notes that the instance node is a child of that parent and thus the ray tracing pipeline 300 determines that the instance node should be traversed to. The determination that the instance node should be traversed to occurs in a first iteration. The iteration is an iteration of an iterative BVH traversal technique, as described elsewhere herein.

At step 904, in a second iteration, the ray tracing pipeline 300 performs a ray transformation as specified by the instance node mentioned in step 902. The ray transformation includes transforming the ray as specified by the instance transform 706 of the instance node, as described elsewhere herein. At step 906, in the second iteration—the same iteration in which the ray transformation occurs—the ray tracing pipeline 300 performs box node intersection tests using the transformed ray and using the bounding box geometry specified in the instance node (i.e., in the box node data 754). For box nodes that are determined to box intersected by the transformed ray, the ray tracing pipeline 300 determines that those box nodes are to be tested for intersection with the transformed ray in a subsequent iteration.

Note that although the present disclosure sometimes refers to triangles as being in the leaf nodes of the bounding volume hierarchy, any other geometric shape could alternatively be used in the leaf nodes. In such instances, compressed triangle blocks include two or more such primitives that share at least one vertex.

Each of the units illustrated in the figures represent hardware circuitry configured to perform the operations described herein, software configured to perform the operations described herein, or a combination of software and hardware configured to perform the steps described herein. For example, the ray tracing pipeline 300, ray generation shader 302, any hit shader 306, hit or miss unit 308, miss shader 312, closest hit shader 310, and acceleration structure traversal stage 304 are implemented fully in hardware, fully in software executing on processing units (such as compute units 132), or as a combination thereof. In some examples, the acceleration structure traversal stage 304 is partially implemented as hardware and partially as software. In some examples, the portion of the acceleration structure traversal stage 304 that traverses the bounding volume hierarchy is software executing on a processor and the portion of the acceleration structure traversal stage 304 that performs the ray-box intersection tests and ray-triangle intersection tests is implemented in hardware.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing operations, the method comprising:

in a first iteration of a ray traversal technique, traversing to an instance node of a bounding volume hierarchy, the instance node including an instance transform and a plurality of bounding volumes, each bounding volume bounding and pointing to different geometry of the same bottom-level acceleration structure, wherein the instance transform indicates how to transform geometry of the bottom-level acceleration structure and the bottom-level acceleration structure is pointed to by multiple instance nodes of the bounding volume hierarchy;

in a second iteration of the ray traversal technique that is subsequent to the first iteration, transforming a ray based on the instance transform to generate a transformed ray; and in the second iteration, performing a ray-box intersection test for box node data of the instance node based on the transformed ray.

2. The method of claim 1, wherein traversing to the instance node is performed in response to encountering a pointer to the instance node during traversal of the bounding volume hierarchy.

3. The method of claim 1, wherein transforming the ray includes performing one or more of translation, scaling, or shearing of the ray.

4. The method of claim 1, further comprising:

during each iteration of the ray traversal technique, fetching one or more nodes of the bounding volume hierarchy from a working set, testing the ray for intersection against the one or more nodes, and storing intersected nodes of the one or more nodes into the working set.

5. The method of claim 1, wherein performing the ray-box intersection test comprises determining whether the transformed ray intersects the box node data.

6. The method of claim 1, wherein the instance node points to a root node of an acceleration structure.

7. The method of claim 1, wherein the box node data includes a bounding box and a box node pointer.

8. The method of claim 1, wherein the instance node includes box node data for a smaller number of box nodes than a box node of the bounding volume hierarchy.

9. The method of claim 1, further comprising:
shading pixels based on results of traversal of the bounding volume hierarchy.

10. A system for performing ray tracing operations, the system comprising:
a memory configured to store a bounding volume hierarchy; and
a processor configured to perform operations comprising:
in a first iteration of a ray traversal technique, traversing to an instance node of the bounding volume hierarchy, the instance node including an instance transform and a plurality of bounding volumes, each bounding volume bounding and pointing to different geometry of the same bottom-level acceleration structure,, wherein the instance transform indicates how to transform geometry of the bottom-level acceleration structure and the bottom-level acceleration structure is pointed to by multiple instance nodes of the bounding volume hierarchy;
in a second iteration of the ray traversal technique that is subsequent to the first iteration, transforming a ray based on the instance transform to generate a transformed ray; and
in the second iteration, performing a ray-box intersection test for box node data of the instance node based on the transformed ray.

11. The system of claim 10, wherein traversing to the instance node is performed in response to encountering a pointer to the instance node during traversal of the bounding volume hierarchy.

12. The system of claim 10, wherein transforming the ray includes performing one or more of translation, scaling, or shearing of the ray.

13. The system of claim 10, wherein the processor is further configured to:
during each iteration of the ray traversal technique, fetch one or more nodes of the bounding volume hierarchy from a working set, testing the ray for intersection against the one or more nodes, and storing intersected nodes of the one or more nodes into the working set.

14. The system of claim 10, wherein performing the ray-box intersection test comprises determining whether the transformed ray intersects the box node data.

15. The system of claim 10, wherein the instance node points to a root node of an acceleration structure.

16. The system of claim 10, wherein the box node data includes a bounding box and a box node pointer.

17. The system of claim 10, wherein the instance node includes box node data for a smaller number of box nodes than a box node of the bounding volume hierarchy.

18. The system of claim 10, wherein the processor is further configured to:
shade pixels based on results of traversal of the bounding volume hierarchy.

19. A non-transitory computer-readable medium storing instructions that, when executed by a processor, cause the processor to perform operations comprising:
in a first iteration of a ray traversal technique, traversing to an instance node of a bounding volume hierarchy, the instance node including an instance transform and a plurality of bounding volumes, each bounding volume bounding and pointing to different geometry of the same bottom-level acceleration structure, wherein the instance transform indicates how to transform geometry of the bottom-level acceleration structure and the bottom-level acceleration structure is pointed to by multiple instance nodes of the bounding volume hierarchy;
in a second iteration of the ray traversal technique that is subsequent to the first iteration, transforming a ray based on the instance transform to generate a transformed ray; and
in the second iteration, performing a ray-box intersection test for box node data of the instance node based on the transformed ray.

20. The non-transitory computer-readable medium of claim 19, wherein traversing to the instance node is performed in response to encountering a pointer to the instance node during traversal of the bounding volume hierarchy.

* * * * *